United States Patent
Li et al.

(10) Patent No.: US 10,746,658 B1
(45) Date of Patent: Aug. 18, 2020

(54) METHOD FOR MATERIAL IDENTIFICATION WITH LASER INDUCED BREAKDOWN SPECTROSCOPY (LIBS)

(71) Applicants: Qun Li, Newark, DE (US); Sean Xiaolu Wang, Wilmington, DE (US)

(72) Inventors: Qun Li, Newark, DE (US); Sean Xiaolu Wang, Wilmington, DE (US)

(73) Assignee: BWT Property, Inc., Newark, DE (US)

( * ) Notice: Subject to any disclaimer, the term of this patent is extended or adjusted under 35 U.S.C. 154(b) by 0 days.

(21) Appl. No.: 16/662,180

(22) Filed: Oct. 24, 2019

(51) Int. Cl.
  *G01J 3/30* (2006.01)
  *G01N 21/71* (2006.01)
  *G01J 3/443* (2006.01)

(52) U.S. Cl.
  CPC ............ *G01N 21/718* (2013.01); *G01J 3/443* (2013.01); *G01N 2201/06113* (2013.01)

(58) Field of Classification Search
  CPC ......... G01N 21/718; G01N 2201/06113; G01J 3/443; G01J 3/30; G01J 3/02; G01J 3/00; G01J 3/44; G01J 3/10
  See application file for complete search history.

(56) References Cited

U.S. PATENT DOCUMENTS

| | | | |
|---|---|---|---|
| 9,366,634 B2 | 6/2016 | Wang et al. | |
| 9,766,182 B2 | 9/2017 | Zhou et al. | |
| 9,797,776 B2 | 10/2017 | Wang et al. | |
| 9,816,934 B2 | 11/2017 | Li et al. | |
| 9,909,923 B2 | 3/2018 | Wang et al. | |
| 9,952,159 B2 | 4/2018 | Wang et al. | |
| 9,958,395 B2 | 5/2018 | Zhou et al. | |
| 2017/0191940 A1* | 7/2017 | Sabsabi ................ G01N 21/718 |

* cited by examiner

*Primary Examiner* — Abdullahi Nur

(57) ABSTRACT

This invention discloses a method for material identification by analyzing the LIBS spectrum of the sample. The LIBS spectrum is pre-processed to equalize the contribution of elements with strong and weak emission lines. In the meantime, the number of spectral variables is reduced to enhance the specificity and minimize the influence of instrument noise. Commonly used spectrum identification and library search algorithms are then applied to the pre-processed LIBS spectrum for material identification.

8 Claims, 2 Drawing Sheets

METHOD FOR MATERIAL IDENTIFICATION WITH LASER INDUCED BREAKDOWN SPECTROSCOPY (LIBS)

FIELD OF THE INVENTION

This invention generally relates to a method for material identification, and more specifically to a method for material identification with laser induced breakdown spectroscopy (LIBS).

BACKGROUND

Laser induced breakdown spectroscopy (LIBS) is a type of atomic emission spectroscopy which uses a highly energetic laser pulse as the excitation source. The laser pulse generates high temperature micro plasma on the surface of the sample. After this excitation, light that is characteristic of the elemental composition of the sample is emitted and analyzed within a spectrometer. LIBS has become a very popular analytical method in view of some of its unique features such as applicability to any type of sample, practically no sample preparation, remote sensing capability, and speed of analysis.

A LIBS spectrum is composed of a plurality of atomic (ionic) emission lines, each corresponding to one element in the sample. LIBS is more sensitive to elements with low ionization energies for which more atoms are excited in response to a particular energy input. It is less sensitive to elements with high ionization energies, such as halogen and chalcogen elements. These elements produce much less and weaker emission lines than elements with prominent peaks such as alkalis, alkaline earth elements, and transition metals. Thus they make much less 'contribution' to the overall LIBS spectrum. This characteristic renders commonly used spectrum identification and library search algorithms less effective when applied to LIBS spectra as the spectral features of those 'weak' elements are often neglected.

SUMMARY OF THE INVENTION

It is thus the goal of the present invention to solve the above mentioned problem and provide a method for material identification by analyzing the LIBS spectrum of the sample. The LIBS spectrum is pre-processed to equalize the spectral response of elements with strong and weak emission lines. In the meantime, the number of spectral variables is reduced to enhance the specificity and minimize the influence of instrument noise. Commonly used spectrum identification and library search algorithms are then applied to the pre-processed LIBS spectrum for material identification.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1A:
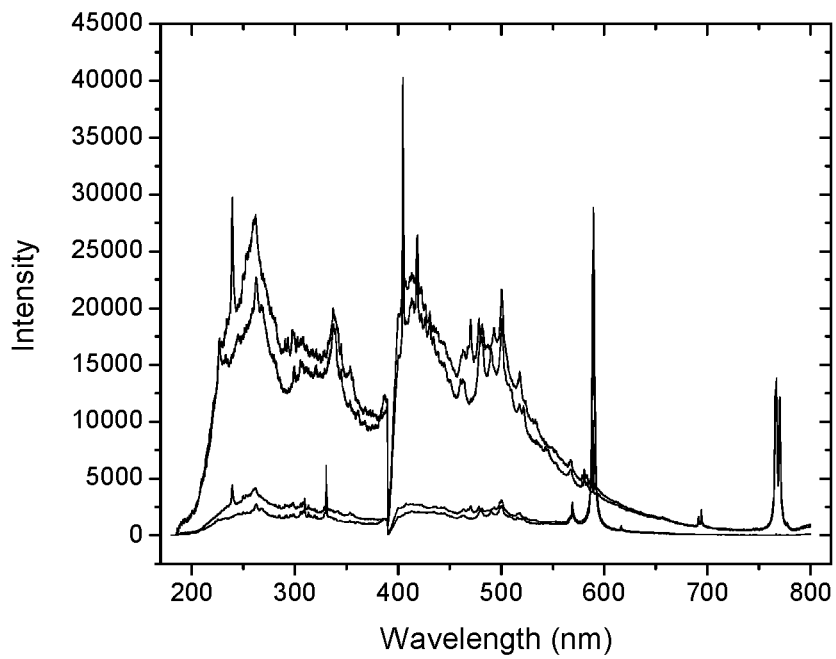
FIG. 1A shows the typical LIBS spectra of some popular monatomic salts used as raw materials in the pharmaceutical industry.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to material identification with laser induced breakdown spectroscopy (LIBS). Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The laser induced breakdown spectroscopy (LIBS) apparatus of the present invention is preferably based on a high repetition rate pulsed laser. The laser produces a train of laser pulses at a high repetition rate in the kHz or even higher range. When the laser beam hits the sample, it generates several thousands of micro plasma emissions per second. Synchronized miniature CCD array optical spectrometer modules collect the LIBS signal from these micro plasma emissions. By adjusting the integration time of the spectrometer to cover a plurality of periods of the laser pulse train, the spectrometer integrates the LIBS signal produced by this plurality of laser pulses. Hence the intensity of the obtained LIBS spectrum can be greatly improved to increase the signal-to-noise ratio (SNR) and lower the limit of detection (LOD). In addition, the influence of pulse to pulse variation of the laser is minimized since the obtained LIBS spectrum is the spectrum of a plurality of micro plasma emissions produced by a plurality of laser pulses. The high repetition rate laser also makes it possible for fast scanning the laser beam over the sample surface such that an average spectrum of the sample is collected to overcome the sample non-uniformity issue or for performing spectral imaging of the sample by correlating the obtained LIBS spectrum with the position of the scanning laser beam. The LIBS apparatus may further comprise a processor unit which implements the spectrum processing, identification, and library search algorithms as disclosed below. A more detailed description of the high repetition rate laser based LIBS apparatus can be found in U.S. Pat. No. 9,909,923, which is hereby incorporated herein by reference.

FIG. 1A shows some typical LIBS spectra of monatomic salts used as raw materials in the pharmaceutical industry, including NaCl, NaBr, KCl, and KBr, which were measured by the above disclosed LIBS apparatus. The spectra of KCl and KBr were obtained with a longer integration time to improve the signal-to-noise ratio (SNR). One can see that the emission lines of anion elements in the salt are much weaker than that of cation elements. The intensity difference can be as large as several tens of times. This poses a challenge for the identification of those anion elements, hence the identification of the whole material. To solve this issue, the LIBS spectrum is pre-processed to equalize the spectral response of elements with strong and weak emission lines. This is achieved through the following steps.

In the first step, a number of materials are selected as the library samples. Each element of interest shall exist in at least one of the library samples so that the library covers all the elements of interest. The library samples are measured with the above disclosed LIBS apparatus to obtain their LIBS spectra.

Figure 1B:
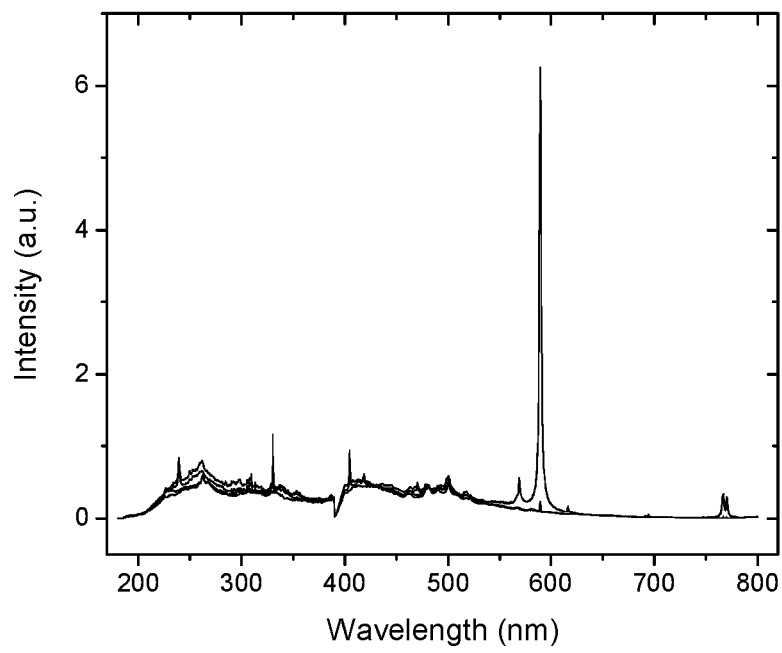
FIG. 1B shows the normalized LIBS spectra of the four salt samples.

In the second step, the collected LIBS spectra of the library samples are normalized to remove the influence of laser power and laser focusing variations, as well as the differences in spectrometer integration time when collecting the spectra. The above disclosed LIBS apparatus uses a non-gated spectrometer. Hence the collected LIBS spectra contain both atomic (ionic) emission and continuum radiation. One exemplary way of normalizing the LIBS spectra is to normalize the intensity of the atomic (ionic) emission in reference to the intensity of the continuum radiation. Here the atomic (ionic) emission corresponds to the spectral lines in the spectrum while the continuum radiation corresponds to the baseline of the spectrum. The intensity of the baseline can be calculated by extracting the baseline mathematically, e.g., through polynomial curve fitting or simply by calculating the intensity of a spectral region where there is no atomic (ionic) emission lines. FIG. 1b FIG. 1B shows the normalized LIBS spectra of the four salt samples by this approach. It can be seen that the normalized LIBS spectra put the emission lines of the elements into the same intensity scale for ease of comparison. Other spectral normalization methods, such as unit vector normalization, can also be employed in this step.

In the third step, the normalized LIBS spectra can be further processed to improve their signal to noise ratio (SNR). As one example, the derivative of each LIBS spectrum is calculated to remove the influence of the continuum radiation. One or more spectral regions corresponding to the emission lines of each element of interest are then selected from the processed LIBS spectra to represent the concentration of the related element.

In the fourth step, for each element of interest, a number of samples representing the most concentration variance of the element are selected from the library samples and principal component analysis (PCA) is performed on the LIBS spectra of these samples at the corresponding spectral regions to extract the principal component for the element. In general, only one principal component is needed to represent each of the selected spectral regions (hence each element). But it is also possible to represent each element with more than one principal component. For each principal component, the PCA score (component score) of each library sample is calculated based on its LIBS spectrum. The PCA score with the maximum absolute value S among the selected library samples is used as the equalization factor for the principal component and the associated element. The LIBS spectrum for each library sample is then represented by a variable reduced spectrum $(p_1, p_2, \ldots, p_i, \ldots, p_n)$, where n is the total number of principal components (when each element is represented by only one principal component, n is equal to the total number of interested elements), and $p_i$ is the normalized PCA score for the i-th principal component, $p_i = P_i/S_i$ where $P_i$ is the PCA score and $S_i$ is the equalization factor. The variable reduced spectrum not only has reduced number of spectral variables for ease of analysis, improved specificity, minimized influence of instrument noise, but the spectral response of each element is also equalized to overcome the sensitivity issue for those elements with weak emission lines.

In the fifth step, the LIBS spectrum of the unknown sample is collected and pre-processed following the above disclosed steps to obtain a variable reduced and equalized spectrum. The spectrum is then compared with the reduced spectra of the library samples for identifying the material of the unknown sample. This can be fulfilled with commonly used spectrum identification and library search algorithms, such as a correlation-based method which calculates the Euclidean distance, median absolute deviation, or the correlation coefficient between the sample spectrum and each library spectrum to obtain a hit quality index (HQI), or a multivariate method based on classification and PCA analysis which calculates the probability value (p-value) for a sample to be identified as a specific material based on a pass/fail result over pre-defined thresholds (typically a statistical p-value of $\geq 0.05$).

Figure 2:
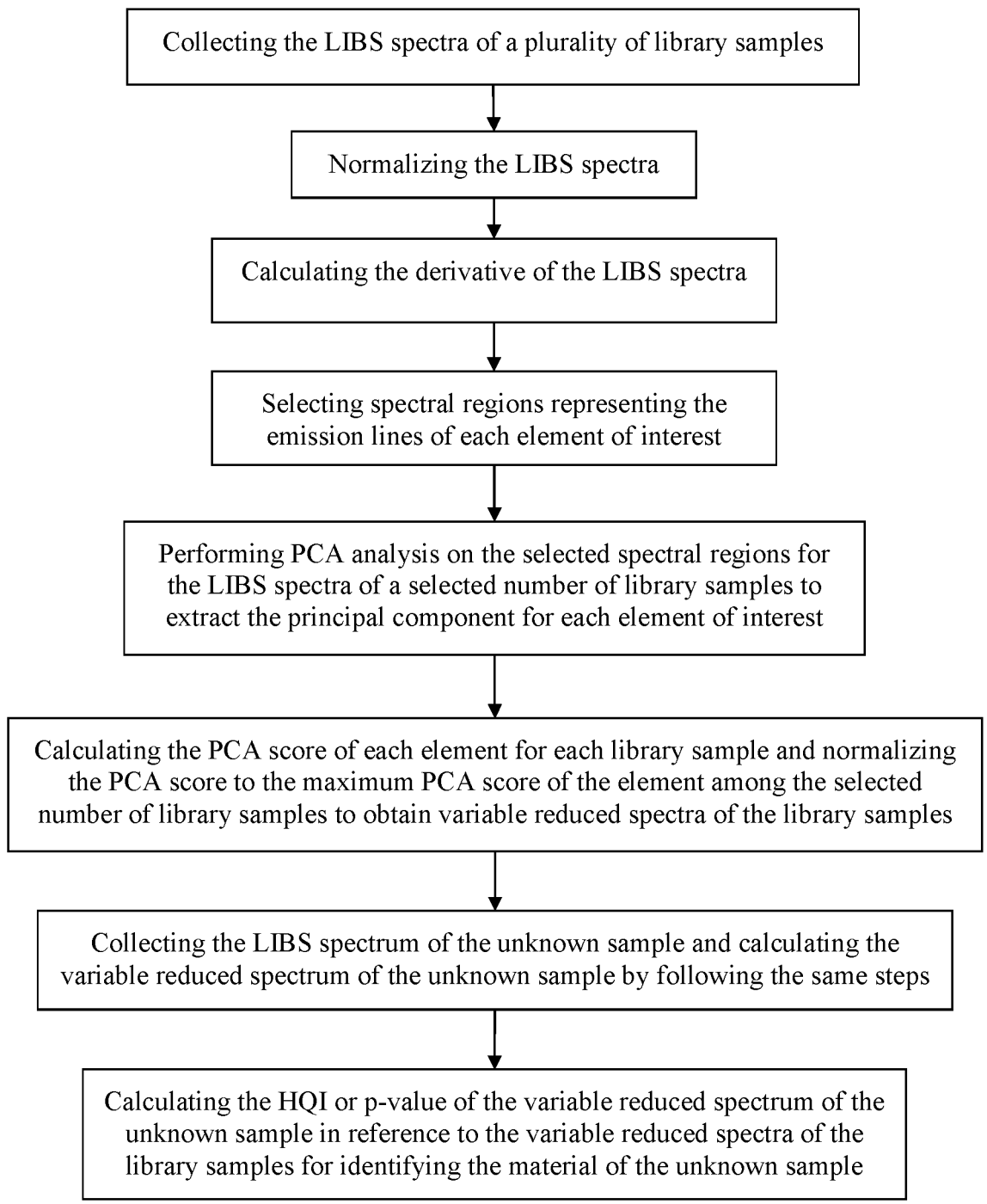
FIG. 2 is a flow chart of the method for material identification with LIBS.

A flow chart of the above disclosed steps is shown in FIG. 2 to further illustrate the method for material identification with LIBS. It is assumed that each element of interest is represented by only one principal component in the flow chart.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for material identification with laser induced breakdown spectroscopy (LIBS), the method comprising the steps of:

collecting the LIBS spectra of a plurality of library samples;

calculating an equalized LIBS spectrum for each library sample, wherein the spectral response of each element of interest is equalized;

collecting the LIBS spectrum of an unknown sample;

calculating an equalized LIBS spectrum for the unknown sample, wherein the spectral response of each element of interest is equalized; and comparing the equalized LIBS spectrum of the unknown sample with the equalized LIBS spectra of the library samples to identify the material of the unknown sample.

2. The method of claim 1, further comprising the step of selecting one or more spectral regions for each element of interest and performing principal component analysis (PCA) for a selected number of library samples at the selected spectral regions to extract principal components for the element.

3. The method of claim 2, wherein the equalized LIBS spectra of the library samples and the unknown sample are calculated by calculating the PCA score of each element of interest for the corresponding LIBS spectra using the extracted principal components and normalizing the PCA score in reference to the maximum PCA score of the element among the selected number of library samples.

4. The method of claim 1, further comprising the step of normalizing the intensity of atomic (ionic) emission in reference to the intensity of continuum radiation of the LIBS spectra of the library samples and the unknown sample to obtain normalized LIBS spectra of the library samples and the unknown sample.

5. The method of claim 1, further comprising the step of calculating derivative of the LIBS spectra of the library samples and the unknown sample.

6. The method of claim 1, wherein the LIBS spectra of the library samples and the unknown sample are measured with a LIBS apparatus comprising a high repetition rate pulsed laser, wherein the high repetition rate pulsed laser produces a train of laser pulses at a high repetition rate in the kHz or even higher range.

7. The method of claim 6, wherein the LIBS apparatus comprises a non-gated spectrometer.

8. The method of claim 7, wherein the integration time of the non-gated spectrometer is adjusted to cover a plurality of periods of the laser pulse train.

* * * * *